US010001596B2

(12) United States Patent
Jang

(10) Patent No.: US 10,001,596 B2
(45) Date of Patent: Jun. 19, 2018

(54) LIGHTING DEVICE

(71) Applicant: LG INNOTEK CO., LTD., Seoul (KR)

(72) Inventor: Chul Ho Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 241 days.

(21) Appl. No.: 14/399,603

(22) PCT Filed: May 7, 2013

(86) PCT No.: PCT/KR2013/003931
§ 371 (c)(1),
(2) Date: Nov. 7, 2014

(87) PCT Pub. No.: WO2013/168949
PCT Pub. Date: Nov. 14, 2013

(65) Prior Publication Data
US 2015/0138829 A1 May 21, 2015

(30) Foreign Application Priority Data
May 10, 2012 (KR) .................. 10-2012-0049726

(51) Int. Cl.
F21V 8/00 (2006.01)
F21S 8/06 (2006.01)
(Continued)

(52) U.S. Cl.
CPC ............ *G02B 6/0078* (2013.01); *F21S 8/061* (2013.01); *F21V 15/015* (2013.01); *F21V 19/0045* (2013.01); *G02B 6/0016* (2013.01); *G02B 6/0021* (2013.01); *G02B 6/0055* (2013.01); *F21V 3/00* (2013.01); *F21Y 2103/10* (2016.08); *F21Y 2105/00* (2013.01);
(Continued)

(58) Field of Classification Search
None
See application file for complete search history.

(56) References Cited

U.S. PATENT DOCUMENTS 4,855,882 A * 8/1989 Boss .................. F21S 8/032
362/219
2001/0046365 A1 11/2001 Bohle
(Continued)

FOREIGN PATENT DOCUMENTS

JP 2005-158353 A 6/2005
JP 2008-103301 A 5/2008
(Continued)

*Primary Examiner* — Sharon Payne
(74) *Attorney, Agent, or Firm* — Birch, Stewart, Kolasch & Birch, LLP

(57) ABSTRACT

A lighting device may be provided that includes: a body; a first light source and a second light source, which are disposed on the body and are disposed symmetrically with each other with respect to a central axis of the body; a first light guide unit which is disposed on the first light source and is coupled to the body; and a second light guide unit which is disposed on the second light source and is coupled to the body. The first light guide unit and the second light guide unit are disposed symmetrically with each other with respect to the central axis of the body.

19 Claims, 24 Drawing Sheets

(51) Int. Cl.
  *F21V 15/015*   (2006.01)
  *F21V 19/00*   (2006.01)
  *F21V 3/00*   (2015.01)
  *F21Y 105/00*   (2016.01)
  *F21Y 113/00*   (2016.01)
  *F21Y 103/10*   (2016.01)
  *F21Y 115/10*   (2016.01)

(52) U.S. Cl.
  CPC ........ *F21Y 2113/00* (2013.01); *F21Y 2115/10* (2016.08); *G02B 6/0038* (2013.01); *G02B 6/0043* (2013.01); *G02B 6/0046* (2013.01); *G02B 6/0061* (2013.01)

(56) References Cited

U.S. PATENT DOCUMENTS

2005/0276065 A1   12/2005   Saccomanno
2008/0219001 A1   9/2008   Russell
2010/0315833 A1   12/2010   Holman
2011/0249425 A1*  10/2011   Aurongzeb ............. F21V 14/02
                                                           362/102
2011/0292680 A1*  12/2011   Tsai ..................... G02B 6/0018
                                                           362/607
2013/0163283 A1*  6/2013   Tanaka ................. G02B 6/0018
                                                           362/611

FOREIGN PATENT DOCUMENTS

JP      2010-250974 A      11/2010
JP      2011-44348 A       3/2011
KR      10-2011-0028000 A  3/2011
KR      10-2011-0033699 A  3/2011
KR      10-1112020 B1      2/2012
KR      10-1139948 B1      4/2012
WO      WO 2009/005062 A1  1/2009
WO      WO 2012/011304 A1 *  1/2012  ................ F21S 2/00

* cited by examiner

[Fig. 1]
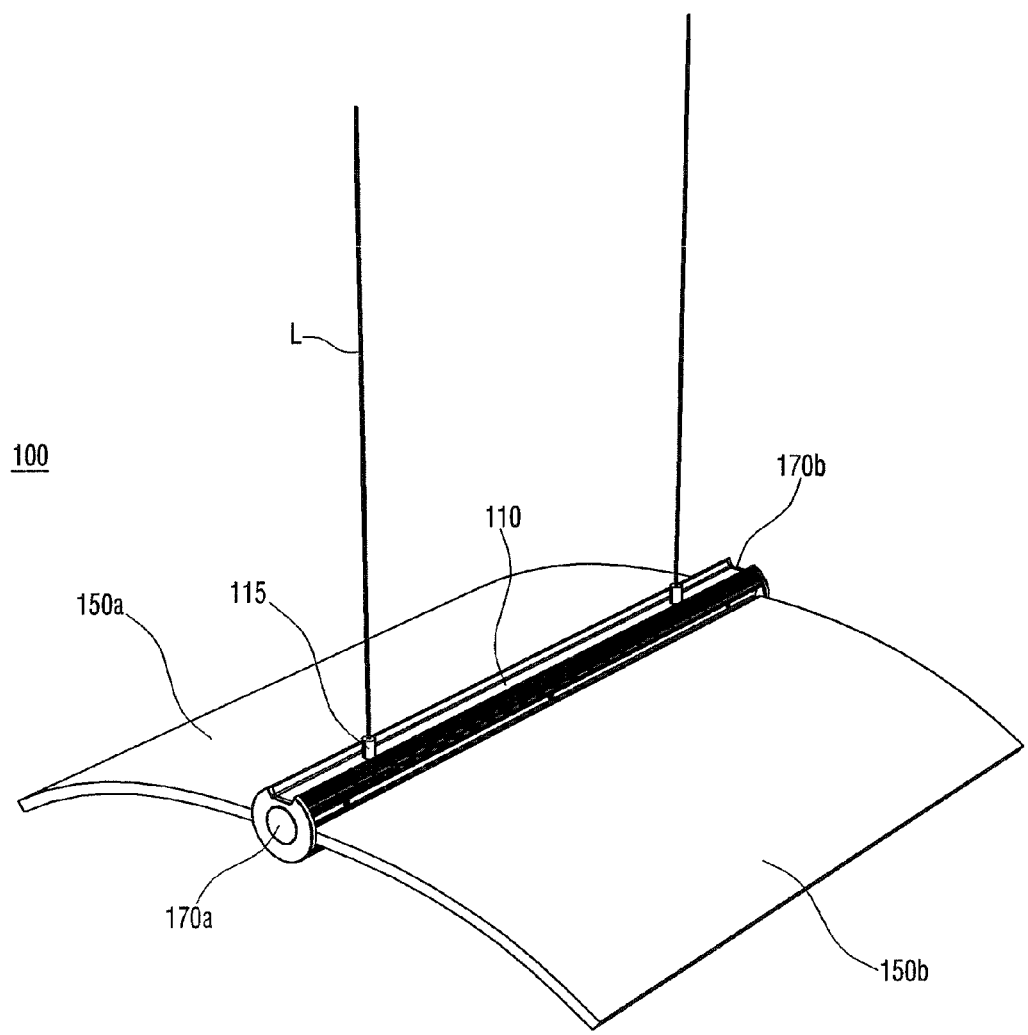

[Fig. 2]
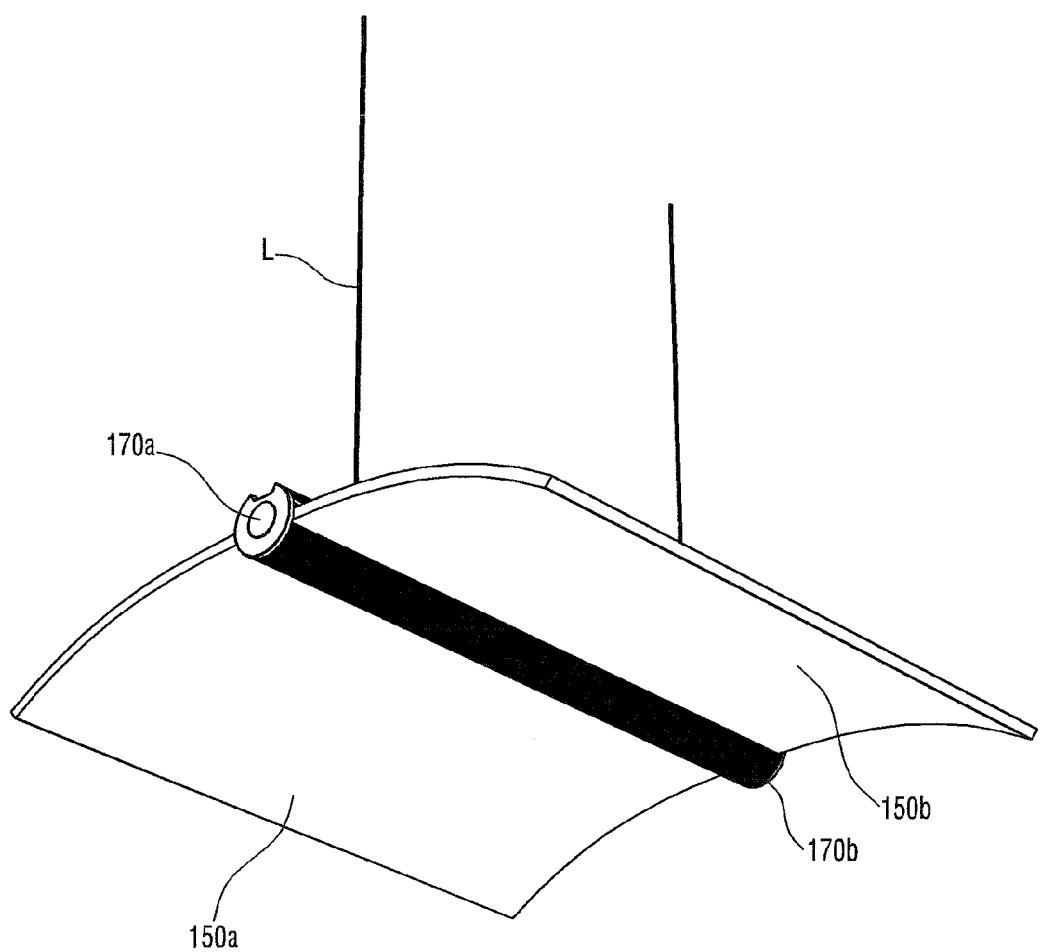

[Fig. 3]
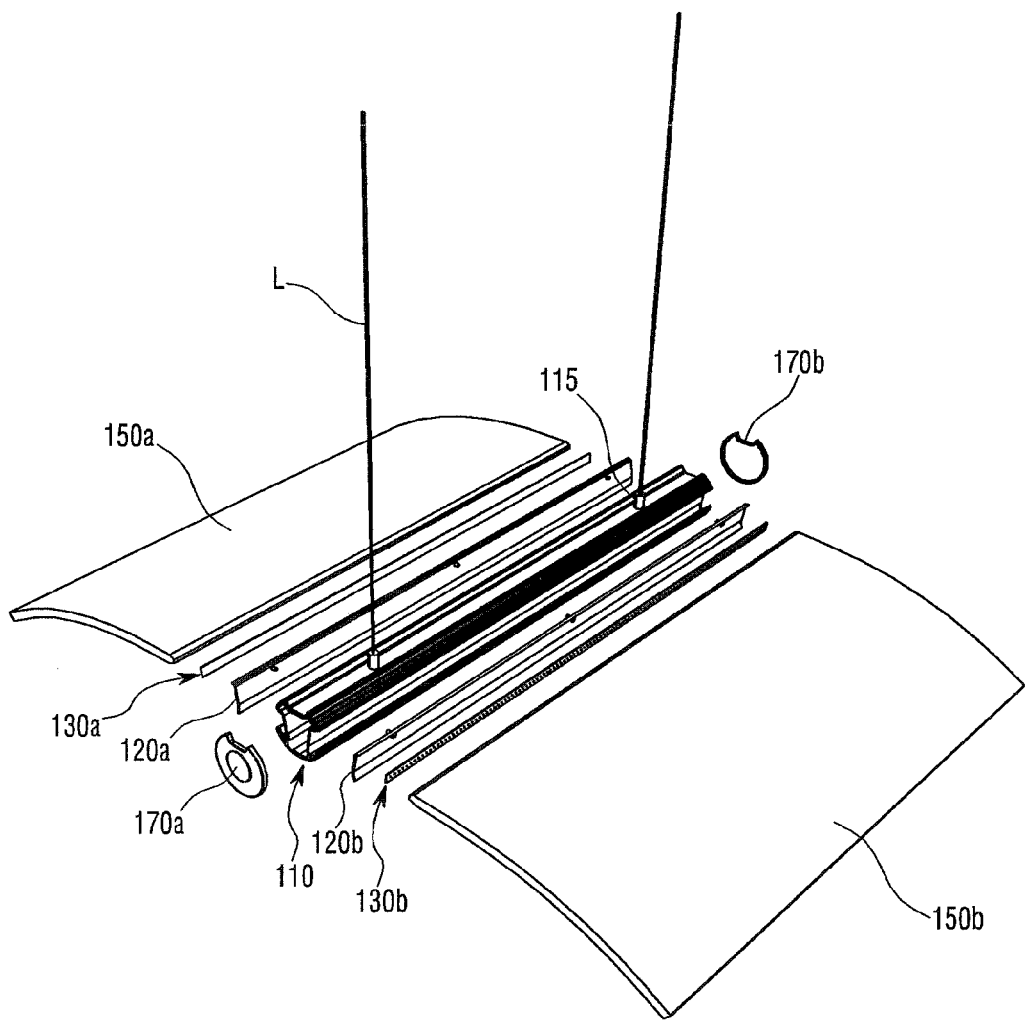

[Fig. 4]
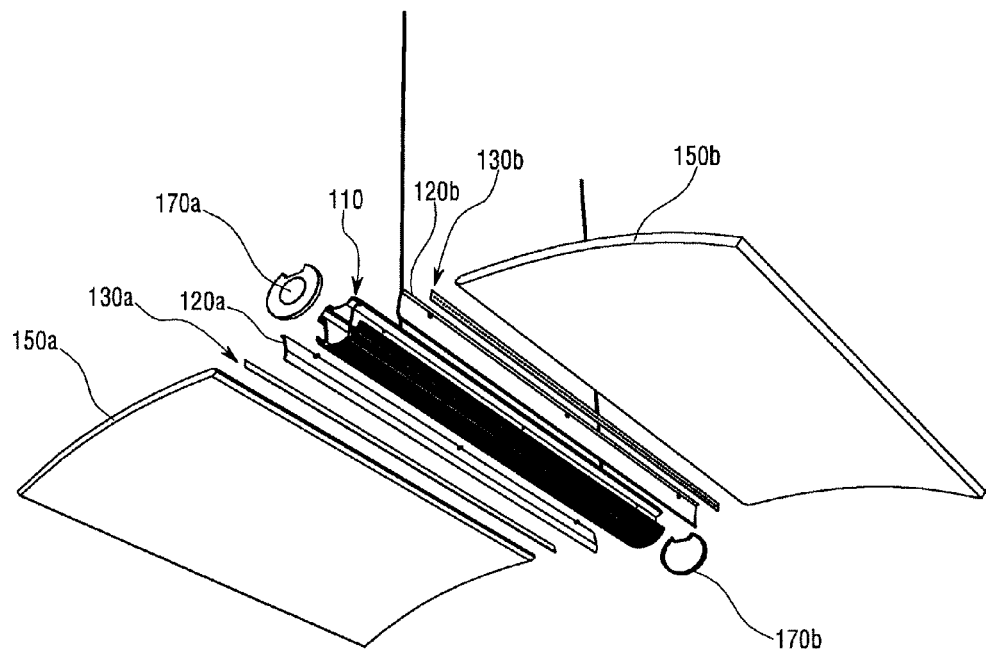
[Fig. 5]
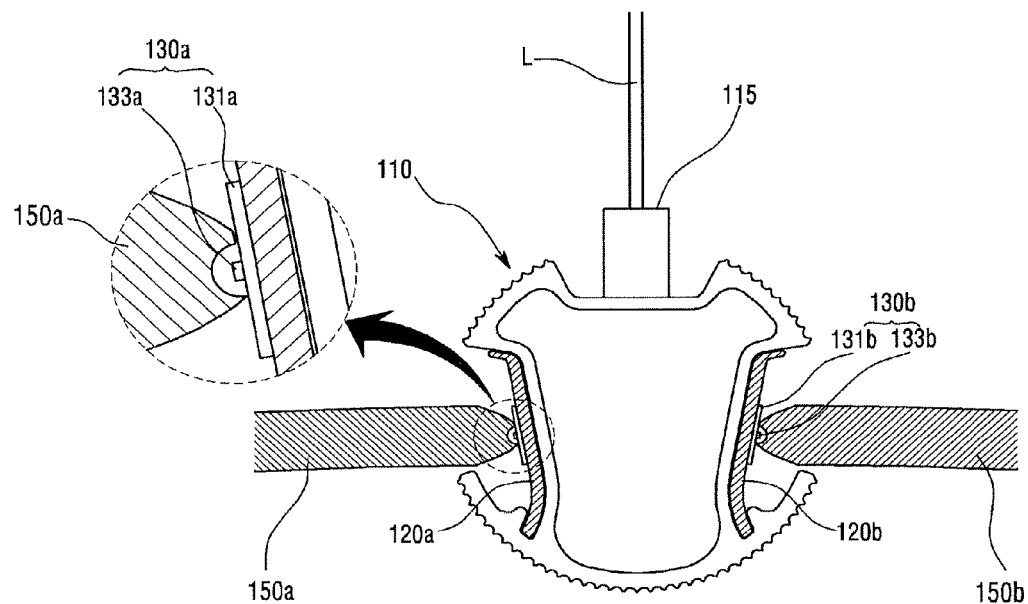

[Fig. 6]
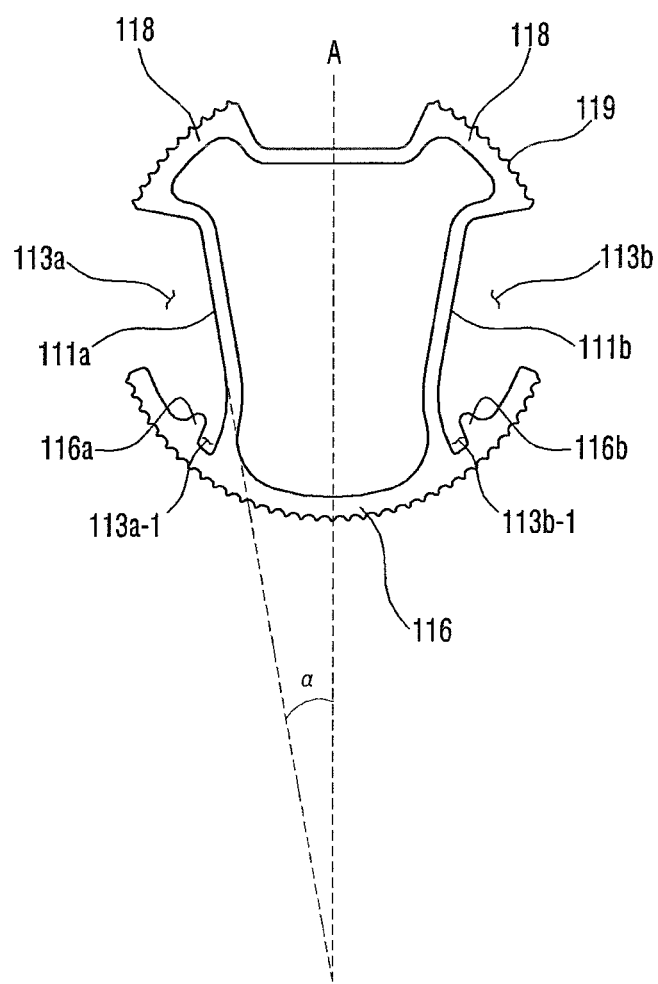

[Fig. 7]
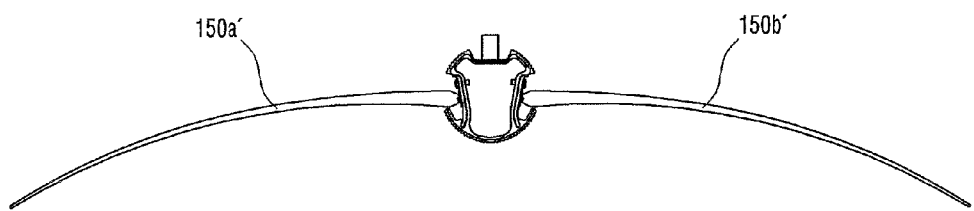

[Fig. 8]
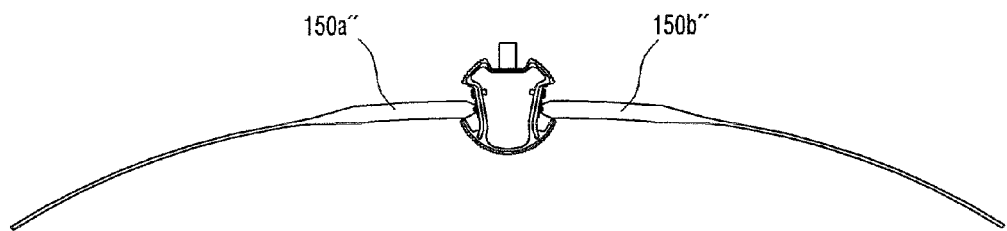

[Fig. 9]
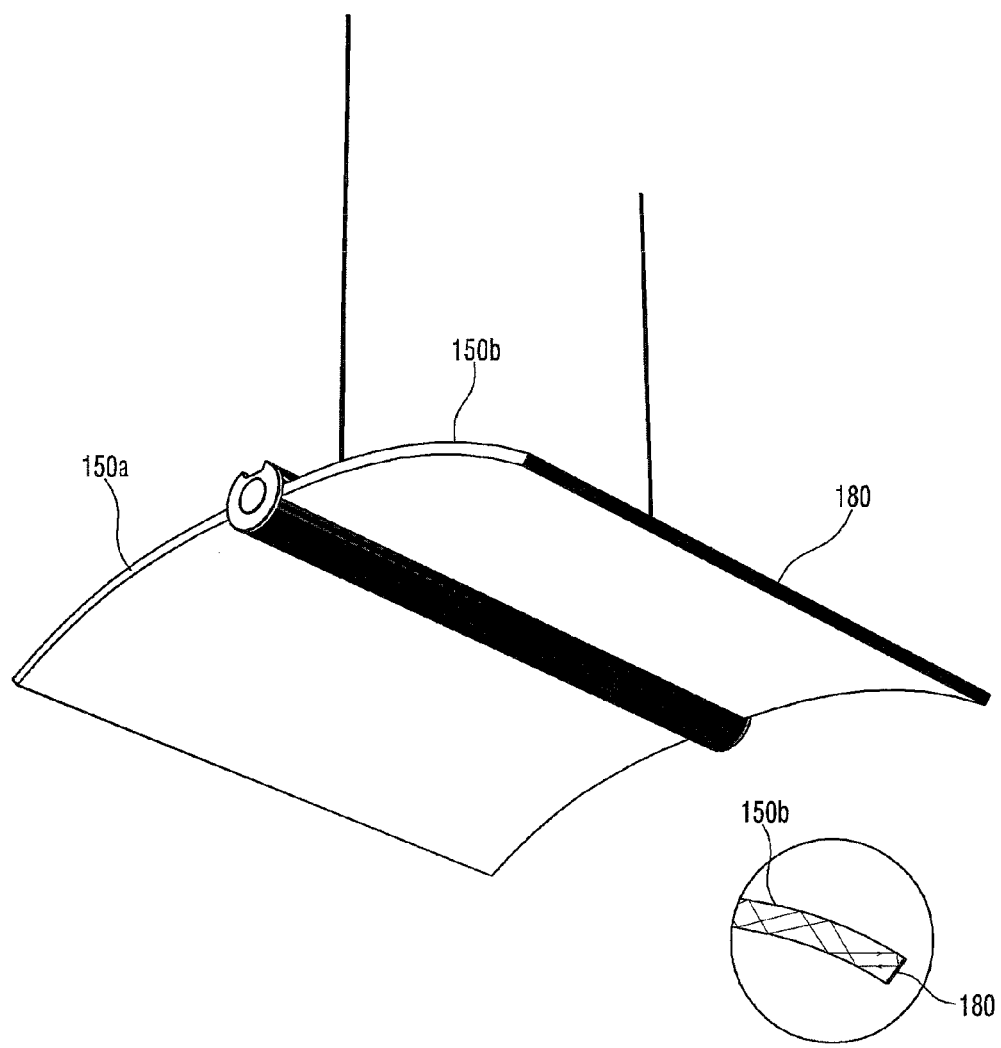

[Fig. 10]
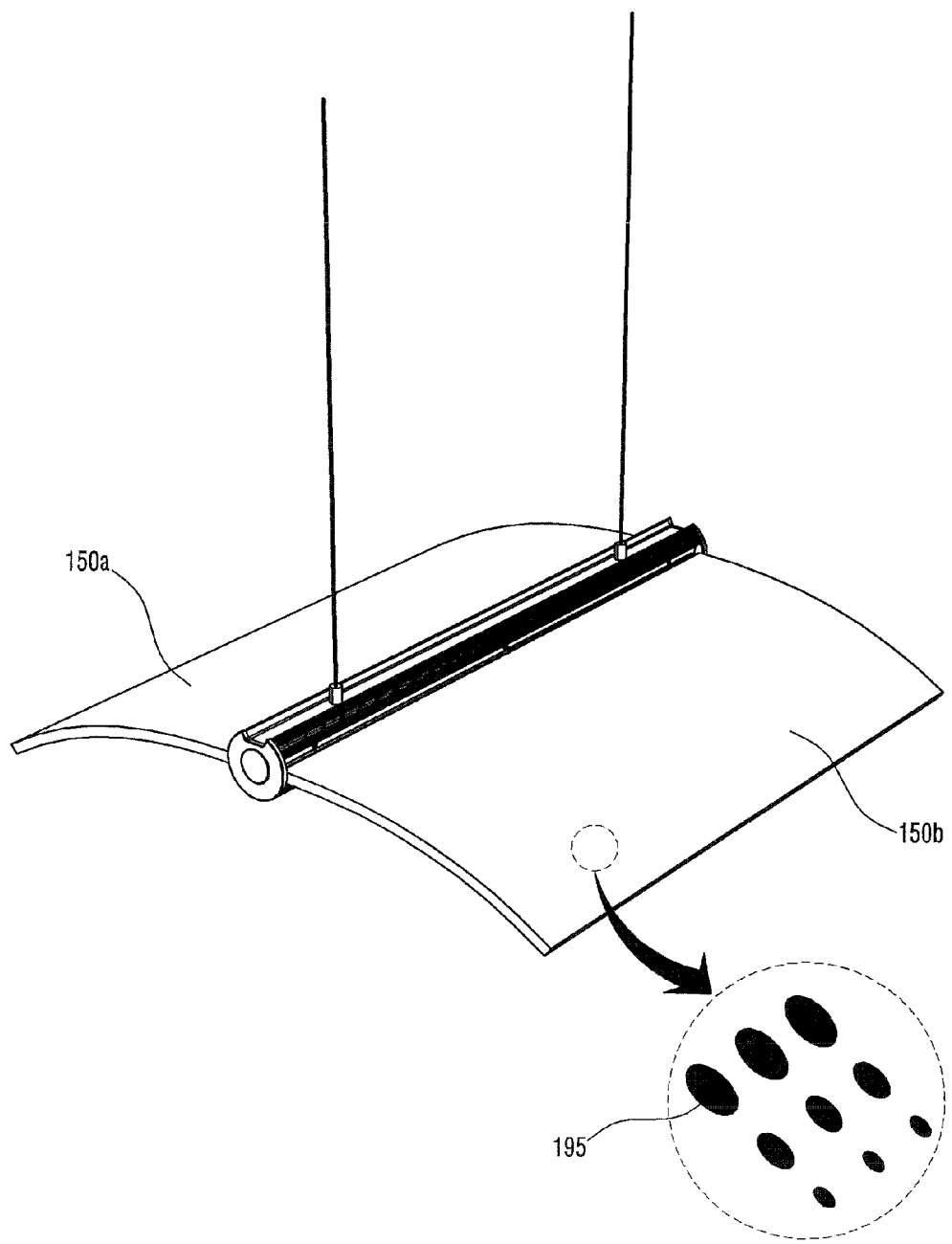

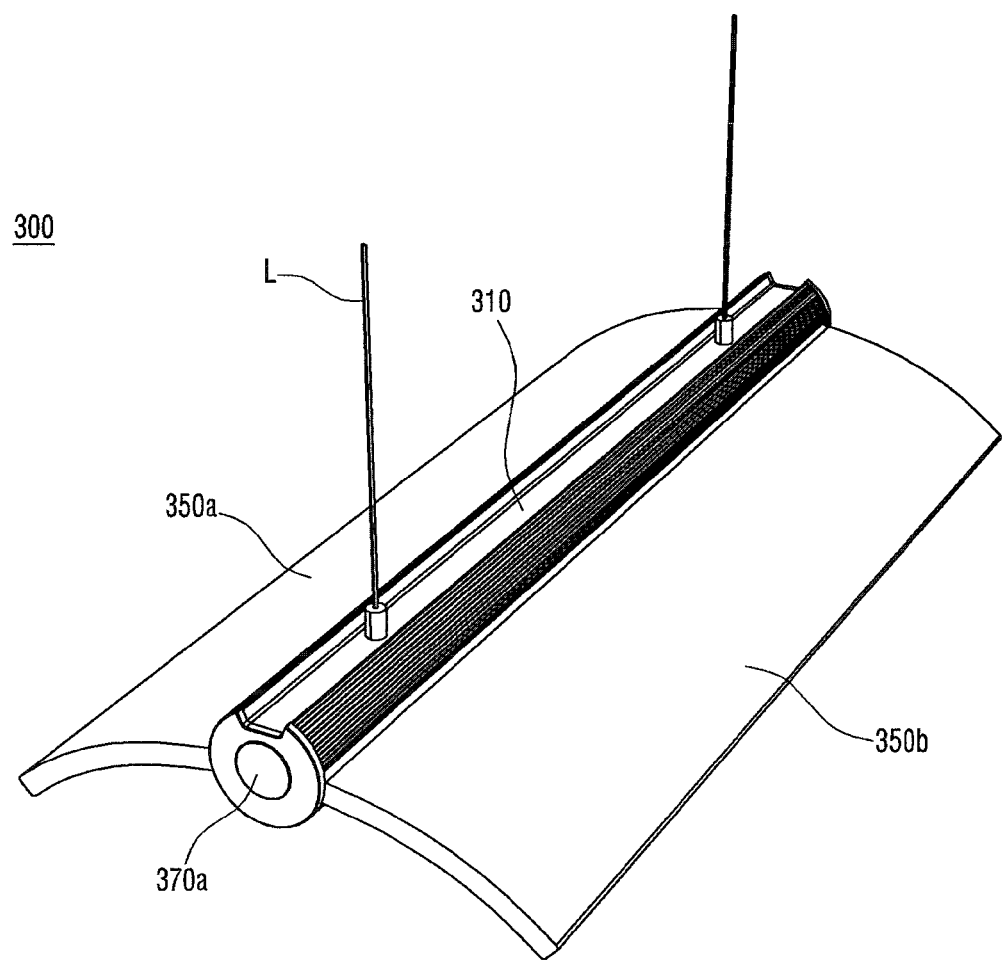
[Fig. 11]

[Fig. 12]
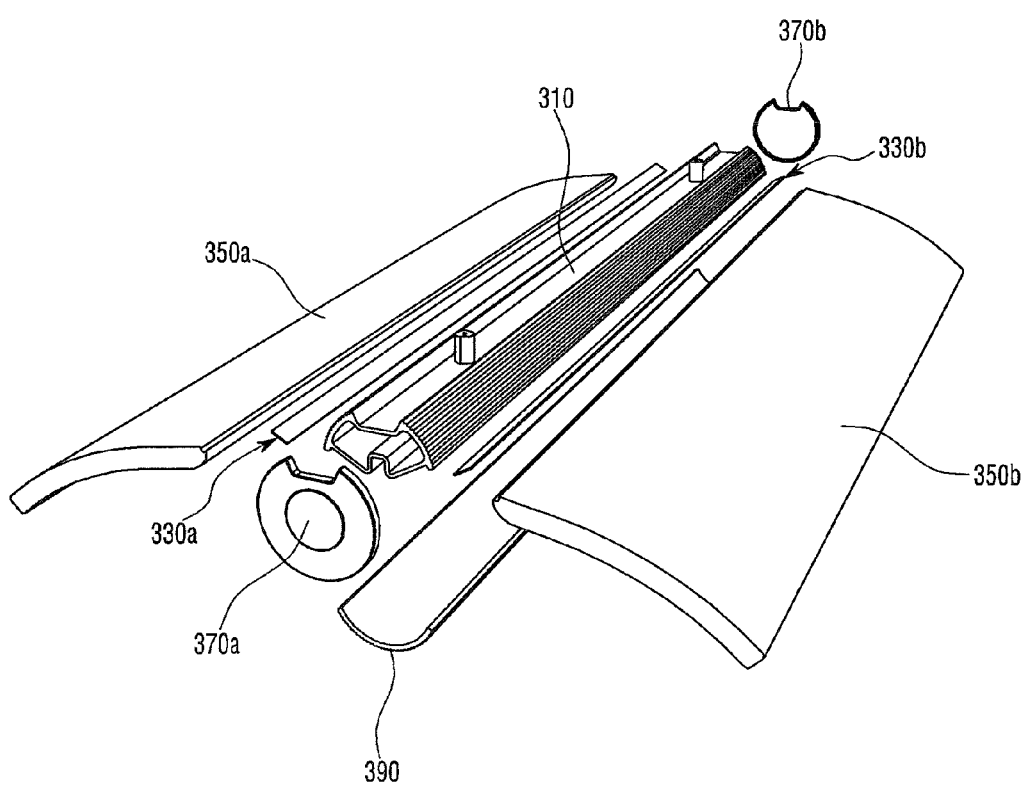

[Fig. 13]
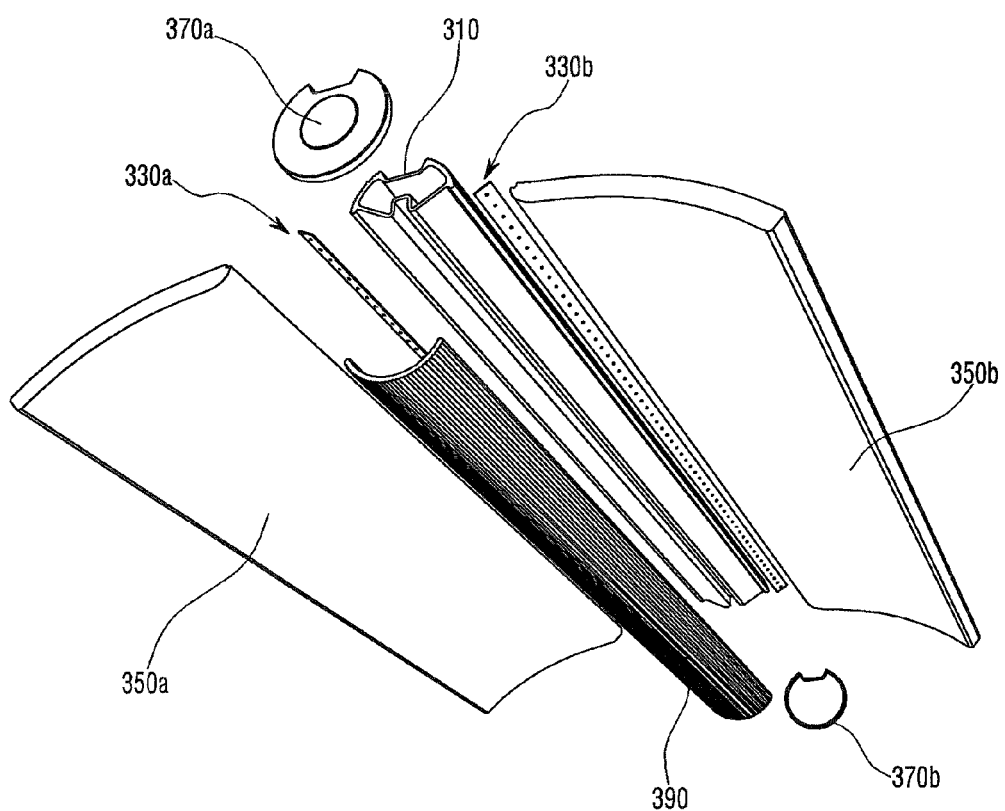

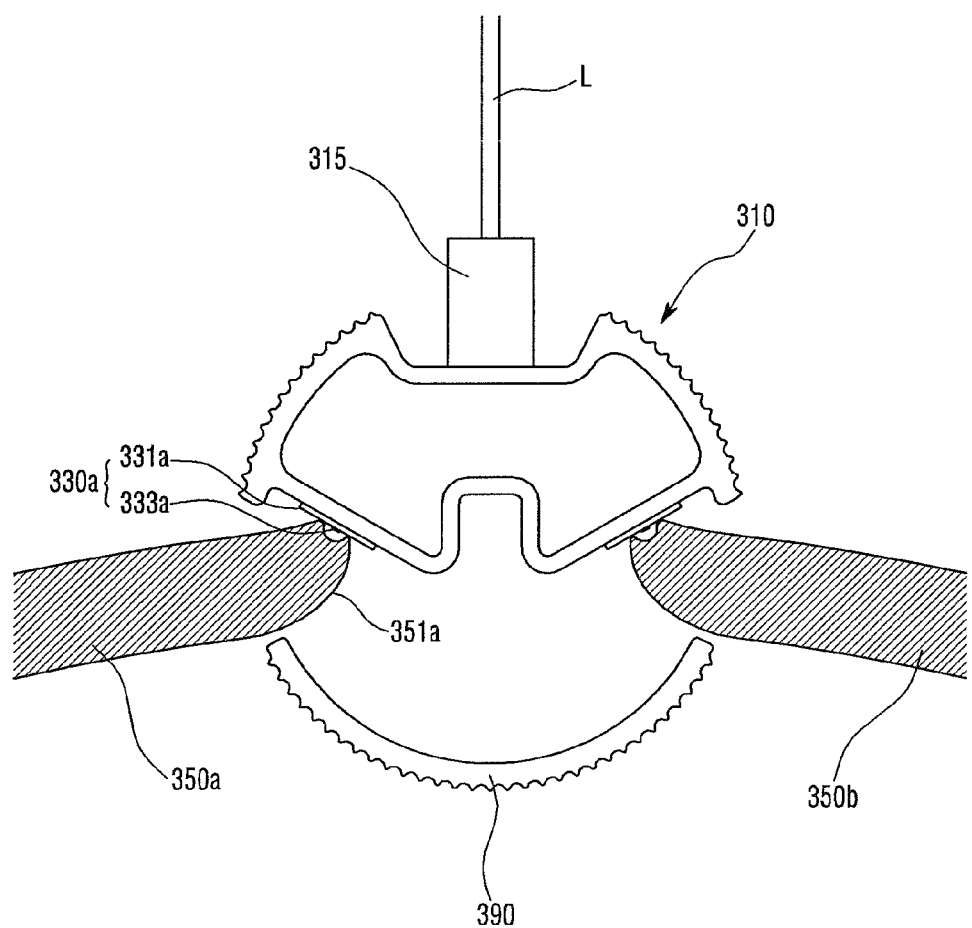
[Fig. 14]

[Fig. 15]
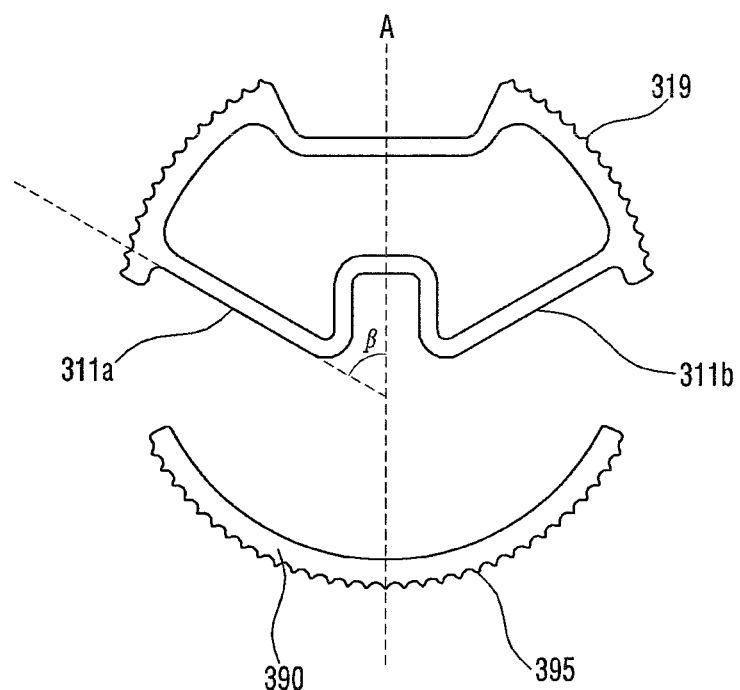

[Fig. 16]
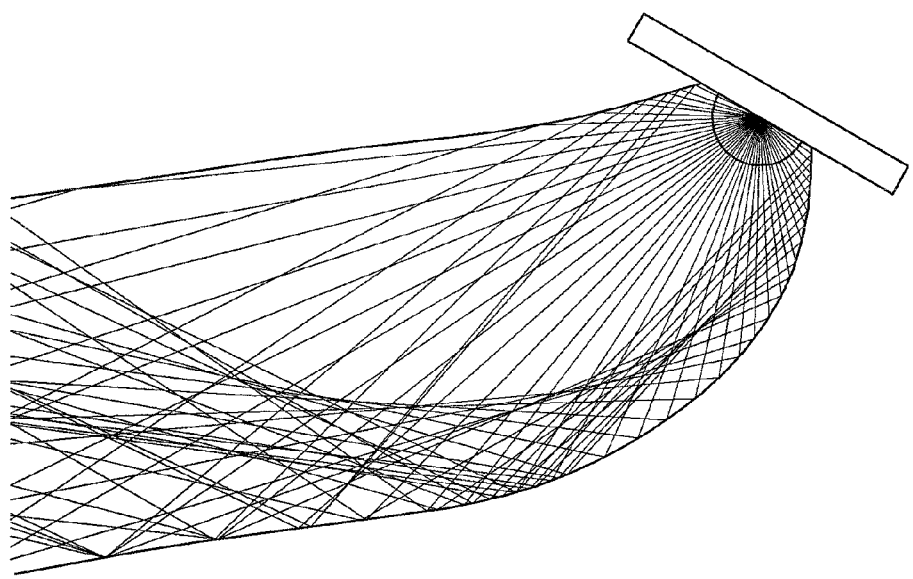

[Fig. 17]
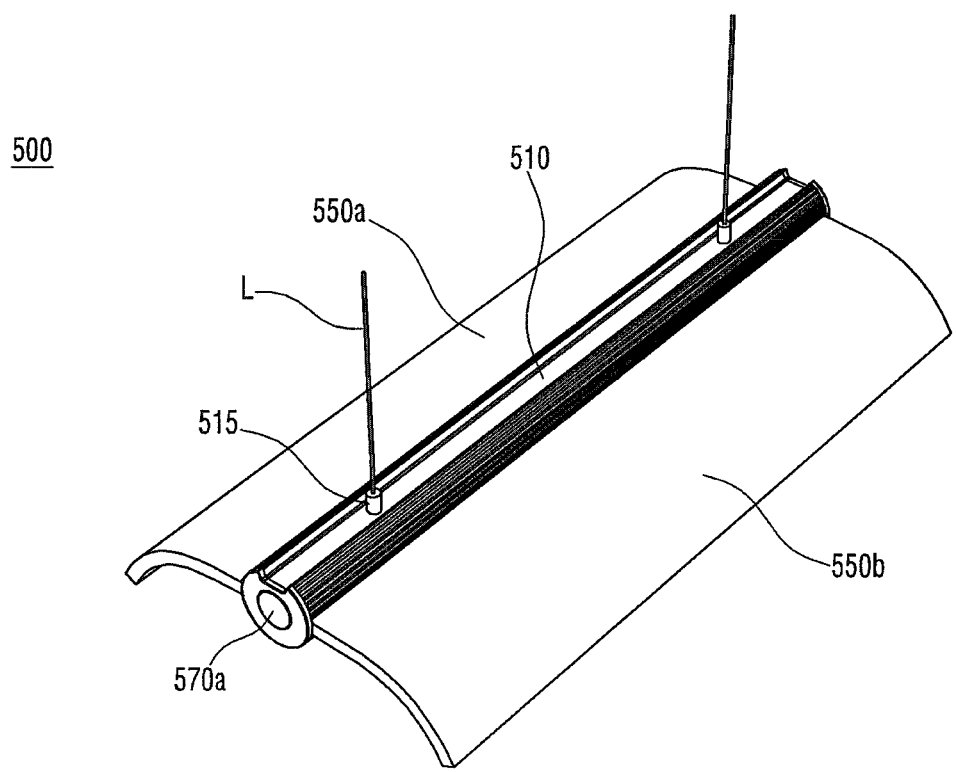

【Fig. 18】
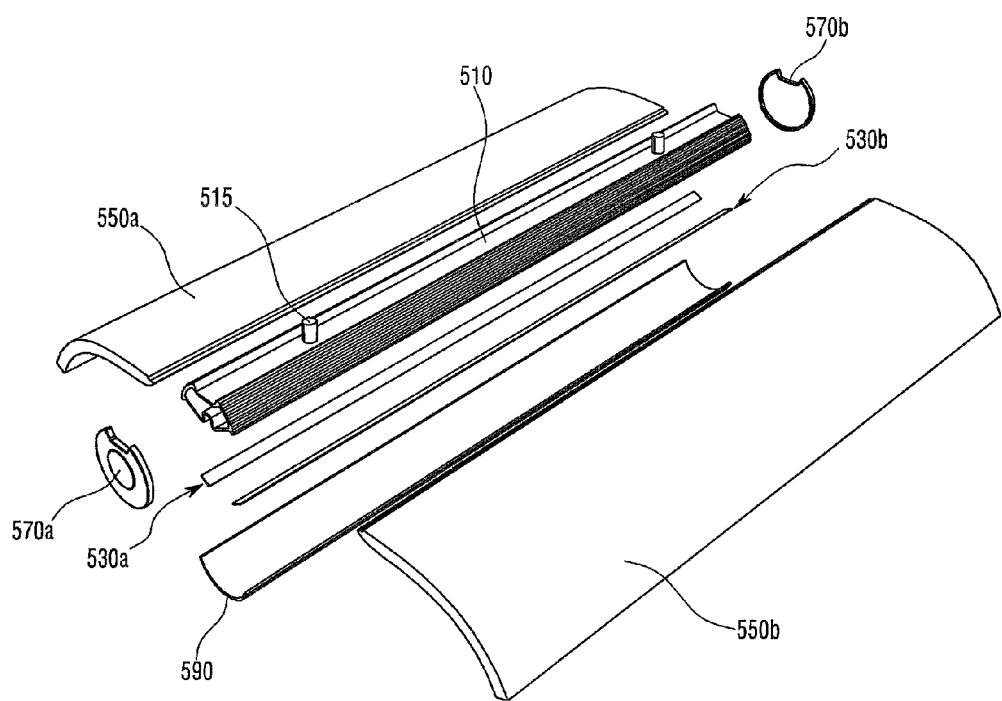

[Fig. 19]
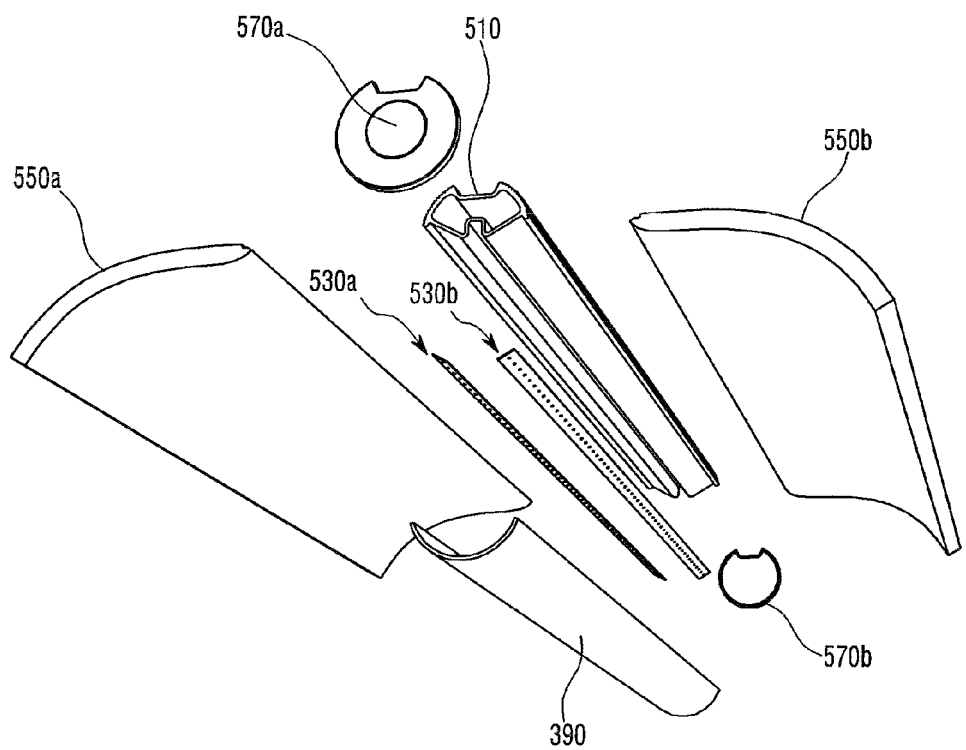

[Fig. 20]
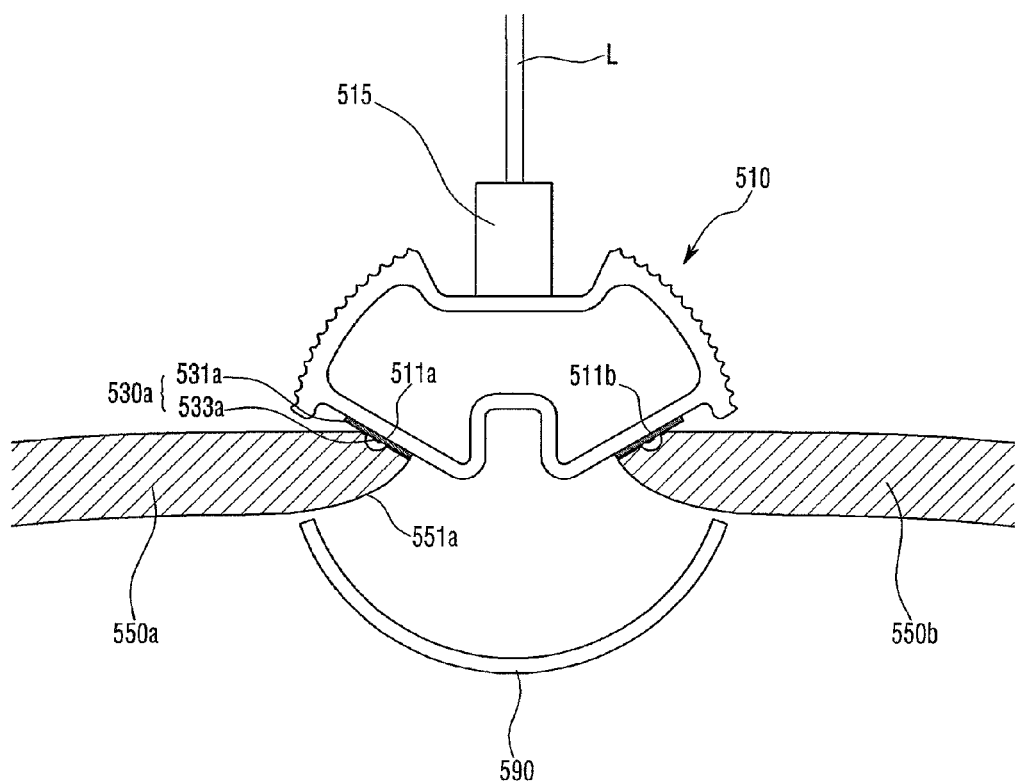

[Fig. 21]
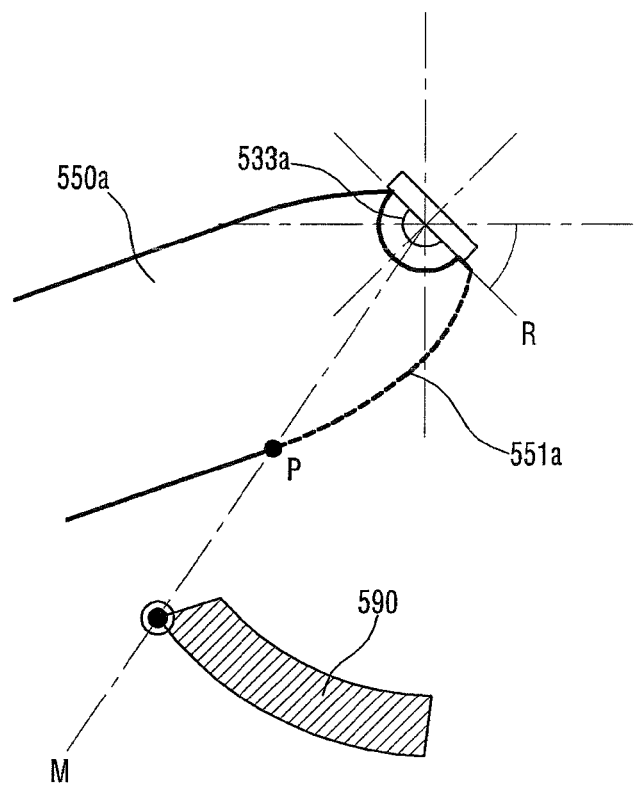
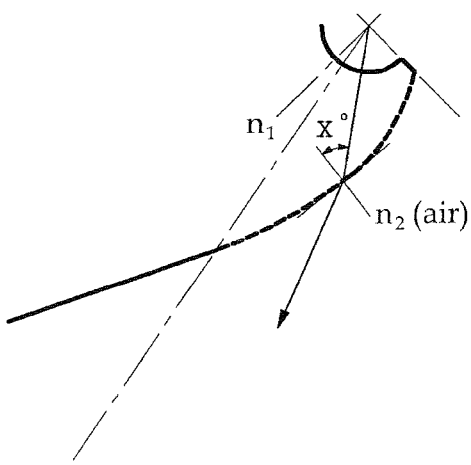

[Fig. 22]
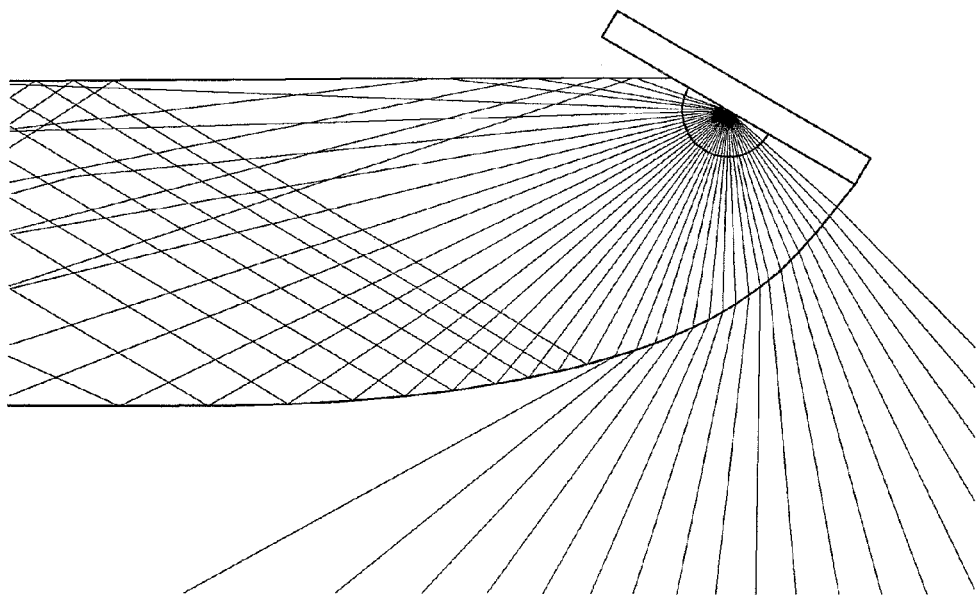

[Fig. 23]
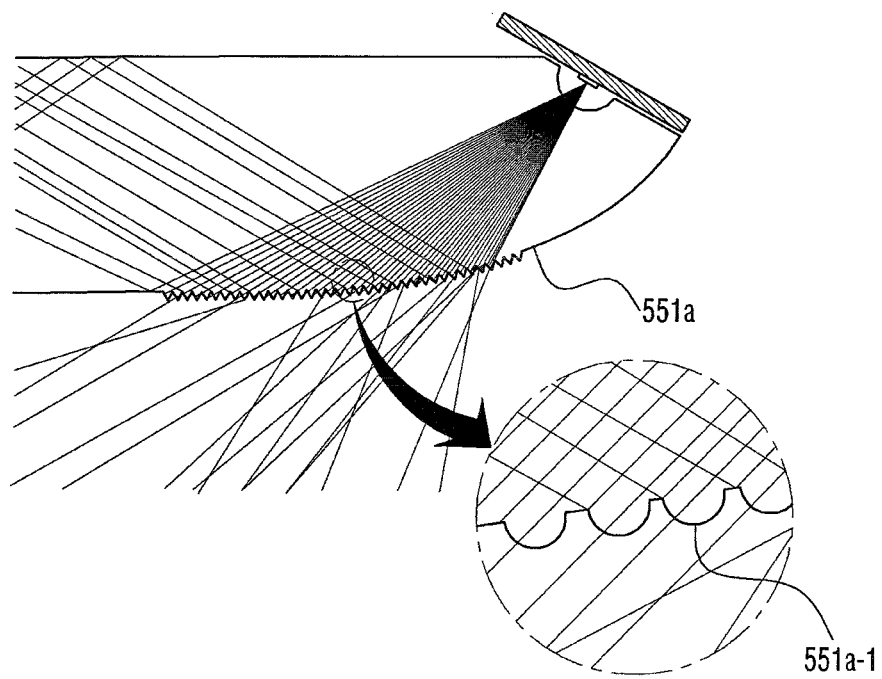

【Fig. 24】
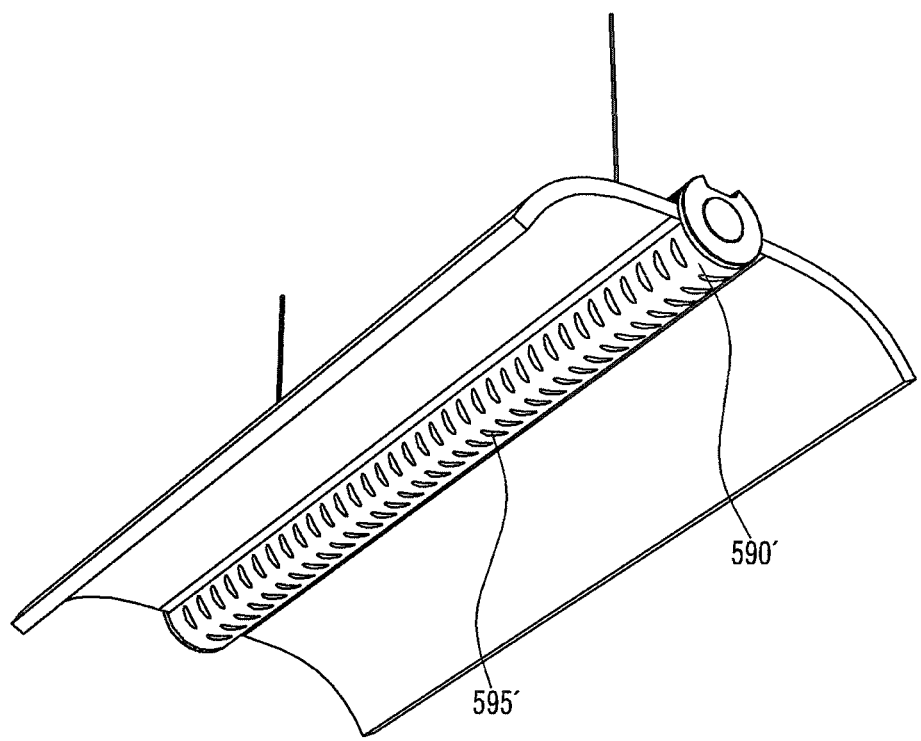

【Fig. 25】
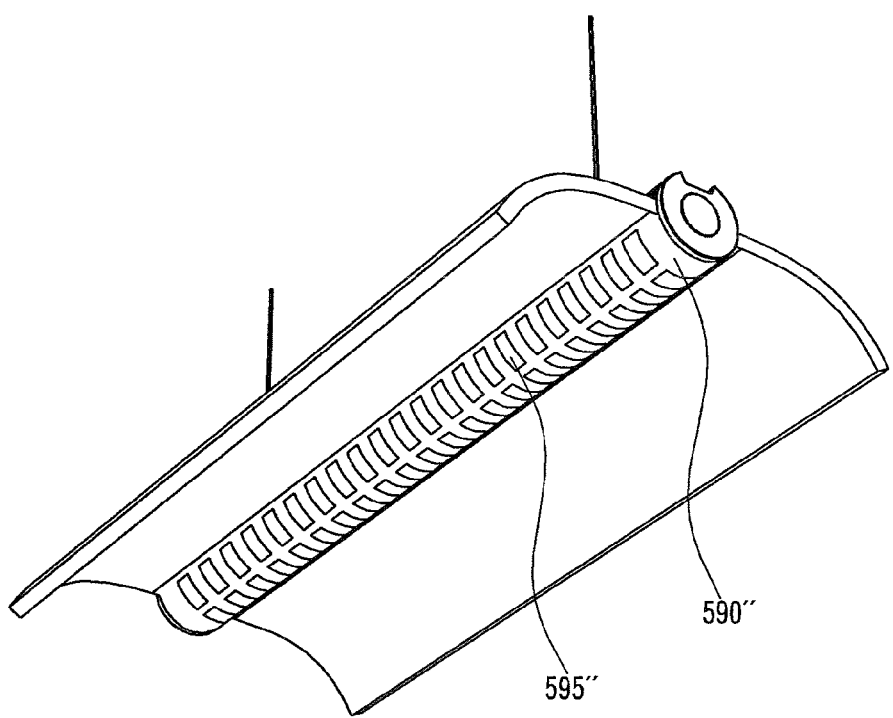

LIGHTING DEVICE

TECHNICAL FIELD

Embodiments may relate to a lighting device.

BACKGROUND ART

A light emitting diode (LED) is a semiconductor element for converting electric energy into light. The LED has advantages of low power consumption, a semi-permanent span of life, a rapid response speed, safety and an environment-friendliness. Therefore, many researches are devoted to substitution of the existing light sources with the LED. The LED is now being increasingly used as a light source for lighting devices, for example, various lamps used interiorly and exteriorly, a liquid crystal display device, an electric sign and a street lamp and the like.

DISCLOSURE

Technical Problem

The embodiment of the present invention provides a new structured lighting device using a light guide unit.

Also, the embodiment of the present invention provides a lighting device capable of controlling an up/down light distribution ratio.

Also, the embodiment of the present invention provides a lighting device capable of controlling an up/down light distribution pattern.

Technical Solution

One embodiment is a lighting device that includes: a body; a first light source and a second light source, which are disposed on the body and are disposed symmetrically with each other with respect to a central axis of the body; a first light guide unit which is disposed on the first light source and is coupled to the body; and a second light guide unit which is disposed on the second light source and is coupled to the body. The first light guide unit and the second light guide unit are disposed symmetrically with each other with respect to the central axis of the body.

The body may include a first receiver receiving the first light source, and a second receiver receiving the second light source. The first receiver may receive one side of the first light guide unit, and the second receiver receives one side of the second light guide unit.

The lighting device may further include a first fixing plate which is disposed in the first receiver and disposed between the first light source and the body, and a second fixing plate which is disposed in the second receiver and disposed between the second light source and the body.

The body may include a coupling portion which is coupled to one sides of the first and the second fixing plates.

The first and the second fixing plates may be coupled to the coupling portion in a sliding manner.

The body may include a first surface on which the first light source is disposed, and a second surface on which the second light source is disposed. The first and the second surfaces may form an acute angle with the central axis of the body.

Each of the first and the second light guide units may include a top surface, a bottom surface and a plurality of sides. The first light source may emit light toward one of the plurality of sides of the first light guide unit.

Each of the first and the second light guide units may have a shape curved upward or downward.

The thickness of each of the first and the second light guide units may be reduced from one side to the other side thereof.

The first light guide unit may include a portion disposed between one side and the other side thereof. The thickness of the portion may be reduced from one side to the other side of the first light guide unit.

The lighting device may further include an optical part which is disposed on at least one of the top surface and the bottom surface of the first light guide unit and controls a distribution pattern of light which is emitted through the top surface and the bottom surface of the first light guide unit or controls a distribution ratio between the light which is emitted through the top surface and the light which is emitted through the bottom surface of the first light guide unit.

The optical part may have a print pattern or a prism structure.

The lighting device may further include a reflector disposed on at least one of the top surface, the bottom surface and the plurality of sides of the first light guide unit.

The reflector is disposed on one side of the first light guide unit.

The lighting device may further include a first end cap and a second end cap which are coupled to both ends of the body respectively.

The body may include a connection member which is connected to a rope connected to the outside.

Another embodiment is a lighting device that includes: a body; a first light source and a second light source, which are disposed on the body, are disposed symmetrically with each other with respect to a central axis of the body and include at least one light emitting device; a first light guide unit which has one side optically coupled to the first light source; and a second light guide unit which has one side optically coupled to the second source. The body includes a first surface on which the first light source is disposed, and a second surface on which the second light source is disposed. The first and the second surfaces form an acute angle with the central axis of the body.

The one side of the first light guide unit may include at least one curved portion on which light from the light emitting device is incident.

The curved portion may totally reflect all of the light emitted from the light emitting device.

The curved portion may include a prism structure for allowing a part of the light from the light emitting device to pass therethrough.

The curved portion may allow a part of the light from the light emitting device to pass therethrough.

The lighting device may further include a cover which is disposed under the one sides of the first and the second light guide units and allows the light from the curved portion to pass therethrough.

The cover may be made of an opaque material and may include an optical transmitting plate for allowing the light from the curved portion to pass therethrough.

Further another embodiment is a lighting device that includes: a body which has a side; a light source which includes a substrate disposed on the side of the body and a light emitting device disposed on a side of the substrate; and a light guide unit which is disposed on the light source and includes a side having a surface on which light from the light emitting device is incident. The side of the light guide unit further includes a curved portion on which the light has passed through the surface is incident. A critical angle of the curved portion is greater than an incident angle of the light incident on the curved portion.

The lighting device may include a cover disposed under the side of the light guide unit. The curved portion may have a range from the side of the light guide unit to a first point. The first point may be an intersection between the light guide unit and a segment connecting the light emitting device with one end of the cover.

Advantageous Effects

According to the embodiment, a new structured lighting device using the light guide unit can be implemented.

Also, according to the embodiment, it is possible to control an up/down light distribution ratio.

Also, according to the embodiment, it is possible to control an up/down light distribution pattern.

DESCRIPTION OF DRAWINGS

FIG. 1 is a top perspective view of a lighting device according to an embodiment;

FIG. 2 is a bottom perspective view of the lighting device shown in FIG. 1;

FIG. 3 is an exploded perspective view of the lighting device shown in FIG. 1;

FIG. 4 is an exploded perspective view of the lighting device shown in FIG. 2;

FIG. 5 is a cross sectional view of the lighting device shown in FIG. 1;

FIG. 6 is a cross sectional view of a body alone shown in FIG. 5;

FIG. 7 is a cross sectional view of a lighting device according to a second embodiment, in other words, a first modified example of the lighting device shown in FIG. 1;

FIG. 8 is a cross sectional view of a lighting device according to a third embodiment, in other words, a second modified example of the lighting device shown in FIG. 1;

FIG. 9 is a cross sectional view of a lighting device according to a fourth embodiment, in other words, a third modified example of the lighting device shown in FIG. 1;

FIG. 10 is a cross sectional view of a lighting device according to a fifth embodiment, in other words, a fourth modified example of the lighting device shown in FIG. 1;

FIG. 11 is a perspective view of a lighting device according to a sixth embodiment;

FIG. 12 is an exploded perspective view of the lighting device shown in FIG. 11;

FIG. 13 is a bottom perspective view of the lighting device shown in FIG. 12;

FIG. 14 is a cross sectional view of the lighting device shown in FIG. 11;

FIG. 15 is a cross sectional view showing a body and cover alone shown in FIG. 14;

FIG. 16 is a simulation result obtained by tracing optical paths of a curved portion shown in FIG. 14;

FIG. 17 is a perspective view of a lighting device according to a seventh embodiment:

FIG. 18 is an exploded perspective view of the lighting device shown in FIG. 17;

FIG. 19 is a bottom perspective view of the lighting device shown in FIG. 17;

FIG. 20 is a cross sectional view of the lighting device shown in FIG. 17;

FIG. 21 is a conceptual view for describing the condition of curved portions of a first light guide unit and a second light guide unit;

FIG. 22 is a simulation result obtained by tracing optical paths of a curved portion shown in FIG. 20;

FIG. 23 is a partial cross sectional view of a lighting device according to an eighth embodiment, in other words, a first modified example of the lighting device shown in FIG. 17; and FIGS. 24 to 25 are perspective views showing modified examples of a cover shown in FIG. 17.

MODE FOR INVENTION

Hereafter, an embodiment of the present invention will be described in detail with reference to accompanying drawings. However, the accompanied drawings are provided only for more easily describing the present invention. It is easily understood by those skilled in the art that the spirit and scope of the present invention is not limited to the scope of the accompanied drawings.

A criterion for "on" and "under" of each layer will be described based on the drawings. A thickness or a size of each layer may be magnified, omitted or schematically shown for the purpose of convenience and clearness of description. The size of each component may not necessarily mean its actual size.

In description of embodiments of the present invention, when it is mentioned that an element is formed "on" or "under" another element, it means that the mention includes a case where two elements are formed directly contacting with each other or are formed such that at least one separate element is interposed (indirectly) between the two elements. The "on" and "under" will be described to include the upward and downward directions based on one element.

FIG. 1 is a top perspective view of a lighting device according to an embodiment. FIG. 2 is a bottom perspective view of the lighting device shown in FIG. 1. FIG. 3 is an exploded perspective view of the lighting device shown in FIG. 1. FIG. 4 is an exploded perspective view of the lighting device shown in FIG. 2. FIG. 5 is a cross sectional view of the lighting device shown in FIG. 1. FIG. 6 is a cross sectional view of a body alone shown in FIG. 5.

Referring to FIGS. 1 to 6, a lighting device 100 according to the first embodiment may include a body 110, a light source 130a and 130b, a light guide unit 150a and 150b, and an end cap 170a and 170b.

The body 110 has a predetermined length in one direction and a tubular shape with an empty interior. Also, the body 110 has a consistent or the same cross section in the one direction.

The light source 130a and 130b is disposed on the outer surface of the body 110. Specifically, the body 110 may include a first surface 111a and a second surface 111b. The first light source 130a is disposed on the first surface 111a. The second light source 130b is disposed on the second surface 111b.

The first and the second surfaces 111a and 111b may be disposed symmetrically with each other with respect to the central axis "A" of the body 110. The first and the second surfaces 111a and 111b may form a first angle "α" with the central axis "A". Here, the first angle "α" is an acute angle and may be from 0 degree to 15 degree. As the first angle "α" is closer to 0 degree, the first light source 130a and the second light source 130b disposed on the first surface 111a and the second surface 111b respectively may emit the light through both sides of the body 110 or perpendicularly to the central axis "A".

The first surface 111a and the second surface 111b may include a flat surface and a curved surface. Here, both of the first surface 111a and the second surface 111b may be the flat surface or curved surface.

The body 110 may include a first receiver 113a and a second receiver 113b. The first receiver 113a and the second receiver 113b may be a recess formed toward the inside of the body 110 from the outer surface of the body 110. One sides of the first light source 130a and the first light guide unit 150a may be disposed in the first receiver 113a. One sides of the second light source 130b and the second light guide unit 150b may be disposed in the second receiver 113b.

The first receiver 113a and the second receiver 113b may be disposed symmetrically with each other with respect to the central axis "A" of the body 110. The bottom surface of the first receiver 113a may be the first surface 111a. The bottom surface of the second receiver 113b may be the second surface 111b.

The first receiver 113a may include a first coupling portion 113a-1. One side of a first fixing plate 120a may be disposed in the first coupling portion 113a-1. The first fixing plate 120a may be coupled to the first coupling portion 113a-1 in a sliding manner. The second receiver 113b may also include a second coupling portion 113b-1 which is the same as the first coupling portion 113a-1.

The body 110 may include a lower portion 116 and an upper portion 118. Here, the lower portion 116 and the upper portion 118 may be divided by the first receiver 113a and the second receiver 113b. The light guide unit 150a and 150b is disposed between the lower portion 116 and the upper portion 118. Here, the lower portion 116 and the upper portion 118 may support the light guide unit 150a and 150b.

The body 110 may include a connection member 115. The connection member 115 may be disposed on the upper portion 118 of the body 110. Specifically, the connection member 115 may be disposed in a groove formed in the upper portion 118 of the body 110. The groove may be formed extending in the longitudinal direction of the body 110. The connection member 115 may be integrally formed with the body 110 or may be securely attached to the body 110. The connection member 115 may be connected to a rope "L" connected to the ceiling.

The body 110 may include a catching protrusion 116a and 116b. Specifically, the lower portion 116 of the body 110 may include the first and the second catching protrusions 116a and 116b. The first catching protrusion 116a may be formed from the inner surface of the lower portion 116 in parallel with the first surface 111a. The first catching protrusion 116a, together with the first surface 111a, may form the first coupling portion 113a-1. By the first catching protrusion 116a, the first surface 111a and the lower portion 116, one side of the first fixing plate 120a may be coupled to the body 110 in a sliding manner. Since the second catching protrusion 116b is the same as the first catching protrusion 116a detailed descriptions thereof will be omitted.

The body 110 may be coupled to the first and the second light sources 130a and 130b, the first and the second light guide units 150a and 150b, the first and the second end caps 170a and 170b. Specifically, the first light source 130a and the first light guide unit 150a are coupled to the body 110 in a first direction toward the body 110. The second light source 130b and the second light guide unit 150b are coupled to the body 110 in a second direction toward the body 110. The first end cap 170a is coupled to the body 110 in a third direction toward the body 110. The second end cap 170b is coupled to the body 110 in a fourth direction toward the body 110. The third and the fourth directions may be substantially perpendicular to the first and the second directions.

The body 110 may be made of a metallic material or resin material which has excellent heat radiation efficiency. However, the material of the body 110 is not limited to this. For example, the material of the body 110 may include at least one of Al, Ni, Cu, Ag, Sn and Mg.

The body 110 may include a plurality of heat radiating fins 119. Specifically, the plurality of heat radiating fins 119 may be disposed on at least one of the lower portion 116 and the upper portion 118 of the body 110. The plurality of heat radiating fins 119 may be formed in the same direction as the longitudinal direction of the body 110. The heat radiating fin 119 increases the surface area of the body 110 and improves the heat radiation effect.

The fixing plate 120a and 120b is disposed on the body 110. Specifically, the first fixing plate 120a is disposed in the first receiver 113a of the body 110 and on the first surface 111a. The second fixing plate 120b is disposed in the second receiver 113b of the body 110 and on the second surface 111b.

The first and the second fixing plates 120a and 120b may be coupled to the body 110 in a sliding manner. One sides of the first and the second fixing plates 120a and 120b may be inserted into and coupled to the coupling portion 113a-1 and 113b-1 of the body 110.

The first light source 130a is disposed on the first fixing plate 120a. The second light source 130b is disposed on the second fixing plate 120b. The first and the second fixing plates 120a and 120b transfer heat from the first and the second light sources 130a and 130b to the body 110. For this, like the body 110, the first and the second fixing plates 120a and 120b may be made of a metallic material.

The light source 130a and 130b is disposed in the body 110. Specifically, the first light source 130a may be disposed on the first surface 111a of the body 110, and the second light source 130b may be disposed on the second surface 111b of the body 110. Also, the first light source 130a may be disposed on the first fixing plate 120a, and the second light source 130b may be disposed on the second fixing plate 120b. Also, the first light source 130a may be disposed in the first receiver 113a, and the second light source 130b may be disposed in the second receiver 113b.

The first and the second light sources 130a and 130b may include substrates 131a and 131b and light emitting devices 133a and 133b respectively. The substrates 131a and 131b and the light emitting devices 133a and 133b are disposed on the body 110.

The substrate 131a and 131b has a rectangular plate shape extending in the longitudinal direction of the body 110. However, the shape of the substrate is not limited to this. For example, the substrate 131a and 131b may have a polygonal plate shape. Here, two or more substrates 131a of the first light source 130a may be provided. Specifically, at least two substrates may be electrically connected and form the substrates 131a of the first light source 130a. The same is true for the substrate 131b of the second light source 130b.

The substrate 131a and 131b may be made by printing a circuit pattern on an insulator. For example, the substrate 131a and 131b may include a common printed circuit board (PCB), a metal core PCB, a flexible PCB, a ceramic PCB or the like. Also, the substrate 131a and 131b may include a chips on board (COB) allowing an unpackaged LED chip to be directly bonded thereon. Also, the substrate 131*a* and 131*b* may be a thin sheet made of an insulating material. The sheet may include the circuit pattern.

The substrate 131*a* and 131*b* may be made of a material capable of efficiently reflecting the light. Otherwise, the surface of the substrate 131*a* and 131*b* may have a color capable of efficiently reflecting the light, for example, white, silver or the like.

A plurality of light emitting devices 133*a* and 133*b* are disposed on the substrate 131*a* and 131*b*. The plurality of light emitting devices 133*a* and 133*b* may be disposed on the substrate 131*a* and 131*b* in one or a plurality of lines.

The light emitting device 133*a* and 133*b* may be a light emitting diode chip which emits red, green or blue light or UV. Here, the light emitting diode may have a lateral type or a vertical type and may emit blue, red, yellow or green light.

The light emitting device 133*a* and 133*b* may have phosphor. When the light emitting device 133*a* and 133*b* is the blue, green, red or UV light emitting diode, the phosphor may include at least one of garnet based phosphor (YAG, TAG), silicate based phosphor, nitride based phosphor and oxynitride based phosphor.

The light guide unit 150*a* and 150*b* is disposed on the light source 130*a* and 130*b*. Specifically, the first light guide unit 150*a* may be disposed on the first light source 130*a*, and the second light guide unit 150*b* may be disposed on the second light source 130*b*. More specifically, the light guide unit 150*a* and 150*b* may have a top surface and a bottom surface, both of which emit the light. A plurality of sides of the light guide unit 150*a* and 150*b* may be located between the top surface and the bottom surface. At least one of the plurality of sides may be optically coupled to the light source 130*a* and 130*b*.

The first and the second light guide units 150*a* and 150*b* may have a quadrangular plate shape respectively. Also, the first and the second light guide units 150*a* and 150*b* may have a predetermined curvature respectively and may be curved upward or downward. Here, the shapes of the first and the second light guide units 150*a* and 150*b* are not limited to this. The first and the second light guide units 150*a* and 150*b* may have a flat plate shape.

The first and the second light guide units 150*a* and 150*b* convert a point light source or a line light source emitted from the first and the second light sources 130*a* and 130*b* into a surface light source.

The one side of the first light guide unit 150*a* is optically coupled to the first light source 130*a*. The other side of the first light guide unit 150*a* is located farthest from the body 110. The one side of the first light guide unit 150*a* is disposed on the substrate 131*a* of the first light source 130*a* and surrounds the light emitting device 133*a*. The one side of the first light guide unit 150*a* is disposed in the first receiver 113*a* of the body 110.

The one side of the second light guide unit 150*b* is optically coupled to the second light source 130*b*. The other side of the second light guide unit 150*b* is located farthest from the body 110. The one side of the second light guide unit 150*b* is disposed on the substrate 131*b* of the second light source 130*b* and surrounds the light emitting device 133*b*. The one side of the second light guide unit 150*b* is disposed in the second receiver 113*b* of the body 110.

The body 110 is disposed between the first light guide unit 150*a* and the second light guide unit 150*b*. Specifically, the body 110 is disposed between the one side of the first light guide unit 150*a* and the one side of the second light guide unit 150*b*. The one side of the first light guide unit 150*a* and the one side of the second light guide unit 150*b* are coupled to the body 110. The other side of the first light guide unit 150*a* and the other side of the second light guide unit 150*b* are located farthest from the body 110.

The first light guide unit 150*a* and the second light guide unit 150*b* are disposed symmetrically with each other with respect to the central axis "A" of the body 110.

The first and the second light guide units 150*a* and 150*b* may have a shape of which the central portion thereof is upwardly convexly curved. Due to the curved shape, the distribution pattern of the light which is upward emitted from the first and the second light guide units 150*a* and 150*b* may become different from the distribution pattern of the light which is downward emitted from the first and the second light guide units 150*a* and 150*b*. Specifically, the light emitted from the top surface of the first and the second light guide units 150*a* and 150*b* may have a first light distribution pattern in which the light is widely diffused. The light emitted from the bottom surface of the first and the second light guide units 150*a* and 150*b* may have a second light distribution pattern in which the light is more narrowly diffused than the light having the first light distribution pattern. Here, the first and the second light guide units 150*a* and 150*b* may have a shape of which the central portion thereof is downwardly convexly curved. Also, the central portion of the first light guide unit 150*a* may be upwardly convex and the central portion of the second light guide unit 150*b* may be downwardly convex, and vice versa.

The thicknesses of the first and the second light guide units 150*a* and 150*b* may be, as shown in the drawings, constant. However, the thickness is not limited to this. That is, the thicknesses of the first and the second light guide units 150*a* and 150*b* may not be constant. The case where the thicknesses of the first and the second light guide units 150*a* and 150*b* are not constant will be described with reference to FIGS. 7 to 8.

FIG. 7 is a cross sectional view of a lighting device according to a second embodiment, in other words, a first modified example of the lighting device shown in FIG. 1. FIG. 8 is a cross sectional view of a lighting device according to a third embodiment, in other words, a second modified example of the lighting device shown in FIG. 1.

Referring to FIG. 7, the first and the second light guide units 150*a*' and 150*b*' of the lighting device according to the second embodiment become thinner from one side to the other side thereof. In this case, the emission rate of the light which totally reflects and traverses within the first and the second light guide units 150*a*' and 150*b*' can be more increased than the emission ratio of the lighting device according to the first embodiment is.

Referring to FIG. 8, the first and the second light guide units 150*a*" and 150*b*" of the lighting device according to the third embodiment become thinner from one side to the other side thereof. However, the first and the second light guide units 150*a*" and 150*b*" are different from the first and the second light guide units 150*a*' and 150*b*' according to the second embodiment. That is, while the thicknesses of the first and the second light guide units 150*a*' and 150*b*' of the lighting device according to the second embodiment are reduced gradually or at a predetermined reduction rate (a first reduction rate) from one side to the other side thereof, the thicknesses of the first and the second light guide units 150*a*" and 150*b*" of the lighting device according to the third embodiment are reduced at a predetermined reduction rate (a second reduction rate) in a portion between one side and the other side thereof and are constant in the other portions respectively. Here, the second reduction rate is higher than the first reduction rate. Like the lighting device according to the second embodiment, the emission rate of the light of the lighting device according to the third embodiment can be more increased than the emission ratio of the lighting device according to the first embodiment is.

Referring back to FIGS. 1 to 6, the first and the second light guide units 150a and 150b may further include a reflector. This will be specifically described with reference to FIG. 9.

FIG. 9 is a cross sectional view of a lighting device according to a fourth embodiment, in other words, a third modified example of the lighting device shown in FIG. 1.

Referring to FIG. 9, the lighting device according to the fourth embodiment is obtained by adding a reflector 180 to the lighting device shown in FIGS. 1 to 6. Here, the reflector 180 can be applied to the lighting device shown in the second to the third embodiments and the below-described lighting device according to another embodiment.

The reflector 180 may be disposed on the surfaces of the first and/or the second light guide unit 150a and 150b. More specifically, the reflector 180 may be disposed on one of several sides of the first and/or the second light guide unit 150a and 150b, for example, a side located farthest from the first and/or the second light source 130a and 130b. Due to the reflector 180, the light which is emitted through the one sides of the first and the second light guide unit 150a and 150b may be incident again on the sides. Therefore, the light which is expected to be emitted to the outside through the one sides of the first and/or the second light guide unit 150a and 150b and lost can be reused. That is, the reflector 180 enables the lighting device according to the fourth embodiment to more improve light extraction efficiency than the lighting device according to the first embodiment.

The reflector 180 may be disposed not only on the one side of the first and/or the second light guide unit 150a and 150b but also on at least one of the top, bottom and other sides of the first and/or the second light guide unit 150a and 150b. Here, if the reflector 180 is disposed on one of the top and the bottom surfaces of the first and/or the second light guide unit 150a and 150b, the lighting device according to the fourth embodiment may emit the light in either only the up direction or only the down direction.

The reflector 180 may be a reflective sheet capable of reflecting light or may be coated or deposited on one side of the first and the second light guide units 150a and 150b.

Referring back to FIGS. 1 to 6, the first and the second light guide units 150a and 150b may further include an optical part. This will be specifically described with reference to FIG. 10.

FIG. 10 is a cross sectional view of a lighting device according to a fifth embodiment, in other words, a fourth modified example of the lighting device shown in FIG. 1.

Referring to FIG. 10, the lighting device according to the fifth embodiment may be obtained by further including an optical part 195 to the lighting device 100 shown in FIGS. 1 to 6. Here, the optical part 195 can be applied to the lighting device shown in the second to the fourth embodiments and the below-described lighting device according to another embodiment.

The optical part 195 may be disposed on one side of the first and/or the second light guide unit 150a and 150b. Specifically, the optical part 195 may be disposed on at least one of the top and the bottom surfaces of the first and/or the second light guide unit 150a and 150b.

The optical part 195 may be a print pattern or prism (fine optic). The optical part 195 is able to control the distribution pattern of light which is emitted through the top surface and the bottom surface of the first and/or the second light guide units 150a and 150b or to control the distribution ratio between the light which is emitted through the top surface and the light which is emitted through the bottom surface of the first and/or the second light guide units 150a and 150b. Specifically, more optical parts 195 are disposed on the top surface than on the bottom surface of the first and/or the second light guide unit 150a and 150b, so that it is possible to control the distribution ratio between the light which is emitted through the top surface and the light which is emitted through the bottom surface of the first and/or the second light guide units 150a and 150b. Also, it is possible to control the light distribution pattern by differentiating the print patterns of the top and the bottom surfaces of the first and/or the second light guide unit 150a and 150b.

The optical part 195 may be comprised of a plurality of dot patterns. The sizes of the plurality of dot patterns may be different from each other. For example, the sizes of the dot patterns may become smaller from one side to the other side of the first and/or the second light guide unit 150a and 150b.

Referring back to FIGS. 1 to 6, the end cap 170a and 170b is disposed on the body 110. Specifically, the first end cap 170a is coupled to one of both ends of the body 110, and the second end cap 170b is coupled to the other of both ends of the body 110. The first and the second end caps 170a and 170b may cover both of the upper portion 118 and the lower portion 116 of the body 110.

The first and the second end caps 170a and 170b are coupled to the body 110, so that it is possible to prevent the first and the second fixing plates 120a and 120b from being separated from the body 110 and to prevent the introduction of insects or impurities into the inside of the body 110 by blocking the both ends of the body 110.

The first and the second end caps 170a and 170b are made of the same material as that of the body 110, thereby improving the heat radiation performance of the lighting device 100.

FIG. 11 is a perspective view of a lighting device according to a sixth embodiment. FIG. 12 is an exploded perspective view of the lighting device shown in FIG. 11. FIG. 13 is a bottom perspective view of the lighting device shown in FIG. 12. FIG. 14 is a cross sectional view of the lighting device shown in FIG. 11. FIG. 15 is a cross sectional view showing a body and cover alone shown in FIG. 14.

Referring to FIGS. 11 to 15, a lighting device 300 according to the sixth embodiment may include a body 310, a light source 330a and 330b, a light guide unit 350a and 350b, an end cap 370a and 370b, and a cover 390.

The configuration of the lighting device 300 according to the sixth embodiment is similar to that of the lighting device 100 according to the first embodiment. In the following description of the lighting device 300 according to the sixth embodiment, configuration or part different from that of the lighting device 100 according to the first embodiment will be specifically described, and the configuration or part the same as or similar to that of the lighting device 100 according to the first embodiment will be replaced by the description of the lighting device 100 according to the first embodiment.

The body 310 may include a first surface 311a on which a first light source 330a is disposed, and a second surface 311b on which a second light source 330b is disposed. The first and the second surfaces 311a and 311b are disposed symmetrically with each other with respect to the central axis "A".

The first and the second surfaces 311a and 311b may form a second angle "β" with the central axis "A". Here, the second angle "β" is an acute angle and may be from 50 degree to 90 degree. Therefore, as the second angle "β" is closer to 90 degree, the light is emitted from the first light source 330a and the second light source 330b disposed on the first surface 311a and the second surface 311b respectively in the down direction of the body 110 or in a direction of the central axis "A".

The light guide unit 350a and 350b is disposed on the light source 330a and 330b. Specifically, the first light guide unit 350a may be disposed on the first light source 330a, and the second light guide unit 350b may be disposed on the second light source 330b.

One side of the first light guide unit 350a is optically coupled to a light emitting device 333a of the first light source 330a and is disposed on a substrate 331a.

The one side of the first light guide unit 350a may have a curved portion 351a. Here, the curved portion 351a may be a portion of the bottom surface of the first light guide unit 350a. The curved portion 351a totally reflects all of the light emitted from the light emitting device 333a. In this case, since the light cannot be emitted to the outside through the curved portion 351a, more amount of light emitted from the light emitting device 333a can be transmitted to the other side of the first light guide unit 350a without being emitted through the curved portion 351a to the outside. Also, even when the light emitting device 333a is installed in the down direction of the body 310 or in the direction of the central axis "A", the light emitted from the light emitting device 333a can be transmitted to the other side of the first light guide unit 350a, in other words, through both sides of the body 310 or perpendicular to the central axis "A". FIG. 16 shows a simulation result obtained by tracing optical paths of the curved portion. Referring to FIGS. 14 and 16, the curvature of the curved portion 351a may be designed in such a manner as to have a specific value capable of totally reflecting all of the light emitted from the light emitting device 333a.

Referring back to FIGS. 11 to 15, the cover 390 may be disposed under and spaced apart from the body 310 at a predetermined distance. The first and the second light guide units 350a and 350b are placed between the cover 390 and the body 310, and the cover 390 and the body 310 may be coupled to each other by the first and the second end caps 370a and 370b.

The material of the cover 390 may be the same as or not the same as that of the body 310. When the material of the cover 390 is a heat radiating material which is the same as that of the body 310, the cover 390 may have a heat radiating fin 395 like a heat radiating fin 319 of the body 310.

The cover 390 is coupled to the body 310 and supports the first and the second light guide units 350a and 350b. The cover 390 is made of an opaque or translucent material, thereby blocking the one sides of the first and the second light sources 330a and 330b and the first and the second light guide units 350a and 350b such that the one sides cannot be seen.

FIG. 17 is a perspective view of a lighting device according to a seventh embodiment. FIG. 18 is an exploded perspective view of the lighting device shown in FIG. 17. FIG. 19 is a bottom perspective view of the lighting device shown in FIG. 17. FIG. 20 is a cross sectional view of the lighting device shown in FIG. 17.

Referring to FIGS. 17 to 20, a lighting device 500 according to the seventh embodiment may include a body 510, a light source 530a and 530b, a light guide unit 550a and 550b, an end cap 570a and 570b, and a cover 590.

The configuration of the lighting device 500 according to the seventh embodiment is similar to that of the lighting device 300 according to the sixth embodiment. In the following description of the lighting device 500 according to the seventh embodiment, configuration or part different from that of the lighting device 300 according to the sixth embodiment will be specifically described, and the configuration or part the same as or similar to that of the lighting device 300 according to the sixth embodiment will be replaced by the description of the lighting device 300 according to the sixth embodiment.

The light guide unit 550a and 550b is disposed on the light source 530a and 530b. Specifically, the first light guide unit 550a may be disposed on the first light source 530a, and the second light guide unit 550b may be disposed on the second light source 530b.

One side of the first light guide unit 550a is optically coupled to a light emitting device 533a of the first light source 330a and is disposed on a substrate 531a.

The one side of the first light guide unit 550a may have a curved portion 551a. Here, the curved portion 551a may be a portion of the bottom surface of the first light guide unit 550a.

Unlike the curved portion 351a of the lighting device according to the sixth embodiment, the curved portion 551a reflects a part of the light emitted from the light emitting device 533a and allows the rest of the light to pass therethrough. Therefore, a predetermined amount of the light is emitted from the curved portion 551a, and the emitted light travels toward the cover 590.

Unlike the cover 390 of the lighting device 300 according to the sixth embodiment, the inner surface of the cover 590 receives the light which is emitted from the curved portion 551a of the first and the second light guide units 550a and 550b, and the outer surface of the cover 590 emits the light incident on the inner surface of the cover 590. In order that the light is emitted from the cover 590, the cover 590 may be made of a transparent or translucent glass or plastic resin material.

Here, the cover 590 may diffuse the light from the first and the second light guide units 550a and 550b and emit. When the cover 590 also emits the light, an optical uniformity of the light emitted from the entire lighting device 500 can be improved.

As described above, the lighting device 500 according to the seventh embodiment is different from the lighting device 300 according to the sixth embodiment in that the cover 590 emits the light. For this, the curved portion 551a of the first and the second light guide units 550a and 550b of the lighting device 500 according to the seventh embodiment allows a part of the light from the light emitting device 533a to pass therethrough.

For the purpose of allowing a part of the light from the light emitting device 533a to pass the curved portion 551a, the curved portion 551a may have a predetermined condition. Specifically, the condition will be described in detail with reference to FIG. 21.

FIG. 21 is a conceptual view for describing the condition of curved portions of a first light guide unit and a second light guide unit.

Referring to FIG. 21, a critical angle "y" of the curved portion 551a should have a predetermined condition so as to allow a part of the light from the light emitting device 533a to pass the curved portion 551a.

The predetermined condition is that the critical angle "y" of the curved portion 551a is greater than an incident angle "x" of the light incident on the curved portion 551a. The critical angle "y" of the curved portion 551a is determined by $\sin^{-1}(n2/n1)$. Here, n1 is a refractive index of the first light guide unit 550a, and n2 is a refractive index of the air. The incident angle "x" corresponds to an angle between any light emitted from the light emitting device 533a and a normal at a point where the curved portion 551a meets the any light.

In the bottom surface of the first light guide unit 550a, the curved portion 551a may be determined by the light emitting device 533a and the cover 590. The range of the curved portion 551a is a portion of the bottom surface of the first light guide unit 550a. The portion may have a range from one side of the first light guide unit 550a to a point "P". The point P" is an intersection between the first light guide unit 550a and a segment "M" connecting the center of the light emitting device 533a with one end point of the cover 590.

The curved portion 551a is determined within a predetermined range of the first light guide unit 550a. The curved portion 551a having a condition in which the critical angle "y" is greater than the incident angle "x" within the predetermined range may allow a part of the light from the light emitting device 533a to pass therethrough.

On the other hand, if the incident angle "x" of the light incident on the curved portion 551a is greater than the critical angle "y" of the curved portion 551a, all light incident from the light emitting device 533a is totally reflected. This may be a condition of one side of the light guide unit 150a and 150b of the lighting device 100 according to the first embodiment and a condition of the curved portion 351a of the lighting device 300 according to the sixth embodiment.

FIG. 22 is a simulation result obtained by tracing optical paths of the curved portion shown in FIG. 20.

Referring to FIGS. 20 and 22, it can be found that a part of the light emitted from the light emitting device 533a is transmitted through the curved portion 551a.

Referring back to FIGS. 17 to 20, the curved portion 551a may have a prism structure in order to allow a part of the light from the light emitting device 533a to pass therethrough. This will be described with reference to FIG. 23.

FIG. 23 is a partial cross sectional view of a lighting device according to an eighth embodiment, in other words, a first modified example of the lighting device shown in FIG. 17.

Referring to FIG. 23, a prism structure 551a-1 is added to the curved portion 551a, so that the curved portion 551a can allow a part of the light emitted from the light emitting device to pass therethrough without reflection. Such a prism structure 551a-1 may be used for the curved portion 551a to totally reflect the light from the light emitting device.

The prism structure 551a-1 may have an uneven structure which is formed to protrude outwardly from the surface of the curved portion 551a. Here, when the prism structure 551a-1 is applied to the first and the second light guide units 350a and 350b of the lighting device 300 according to the sixth embodiment, the curved portion 351a of the lighting device 300 according to the sixth embodiment may allow a part of the light from the light emitting device 333a to pass therethrough without total reflection.

FIGS. 24 to 25 are perspective views showing modified examples of a cover shown in FIG. 17.

Referring to FIGS. 24 to 25, a cover 590' and 590" may be made of an opaque material instead of a transparent or translucent material and may include an optical transmitting plate 595' and 595". The light may be emitted from the cover 590' and 590" through the optical transmitting plate 595' and 595".

The optical transmitting plate 595' and 595" may have, as shown in FIG. 24, a circular shape or may have, as shown in FIG. 25, a quadrangular shape. Further, the optical transmitting plate 595' and 595" may have various shapes such as an elliptical shape, a polygonal shape or the like.

Although various embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

The invention claimed is:

1. A lighting device comprising:
a body having a predetermined length in one direction and a tubular structure with an empty interior, wherein the body includes a first recess and a second recess which are disposed symmetrically with each other with respect to a central axis of the body, wherein the first recess includes a first surface and wherein the second recess includes a second surface;
a first fixing plate disposed in the first recess of the body and on the first surface;
a second fixing plate disposed in the second recess of the body and on the second surface;
a first light source disposed in the first recess of the body and on the first fixing plate;
a second light source disposed in the second recess of the body and on the second fixing plate, wherein the first light source and the second light source are disposed symmetrically with each other with respect to the central axis of the body;
a first light guide unit including one side which is optically coupled to the first light source and is disposed in the first recess of the body; and
a second light guide unit including one side which is optically coupled to the second light source and is disposed in a second recess of the body,
wherein the first light guide unit and the second light guide unit are disposed symmetrically with each other with respect to the central axis of the body,
wherein the thickness of each of the first and the second light guide units is reduced from one side to the other side thereof,
wherein the first light guide unit and the second light guide unit are extended from the first light source and the second light source, respectively, in opposite directions from each other,
wherein the first light guide unit and the second light guide unit have a shape of which a central portion is upwardly convexly curved,
wherein each of the first light guide unit and the second light guide unit emits lights upward and downward,
wherein the first light source comprises a first substrate and a first light emitting device,
wherein the second light source comprises a second substrate and a second light emitting device,
wherein the first light emitting device is disposed in a first groove of the first light guide unit and the second light emitting device is disposed in a second groove of the second light guide unit, and
wherein the one side of the first light guide unit comprises at least one curved portion on which light from the first light emitting device is incident.

2. The lighting device of claim 1, wherein the body comprises a coupling portion which is disposed in the first and second recess and is coupled to one side of the first and the second fixing plates.

3. The lighting device of claim 1, wherein the first and the second surfaces form an acute angle with the central axis of the body.

4. The lighting device of claim 1, further comprising a reflector disposed on at least one of the top surface, the bottom surface and the plurality of sides of the first light guide unit.

5. The lighting device of claim 4, wherein the reflector is disposed on one side of the first light guide unit.

6. The lighting device of claim 2, wherein the first and second fixing plates are coupled to the coupling portion in a sliding manner.

7. The lighting device of claim 1, further comprising a cover which is disposed under the one side of the first and the second light guide units and allows the light from the at least one curved portion to pass therethrough.

8. The lighting device of claim 7, wherein the cover is made of an opaque material and comprises an optical transmitting plate for allowing the light from the at least one curved portion to pass therethrough.

9. The lighting device of claim 1, further comprising a first end cap and a second end cap which are coupled to both ends of the body, respectively.

10. The lighting device of claim 1, wherein the body comprises a connection member which is connected to a rope that is connected to the outside.

11. The lighting device of claim 1, wherein the at least one curved portion comprises a prism structure for allowing a part of the light from the first light emitting device to pass therethrough.

12. A lighting device comprising:
a body having a predetermined length in one direction and a tubular shape with an empty interior, wherein the body includes a first recess and a second recess which are disposed symmetrically with each other with respect to a central axis of the body, wherein the first recess includes a first surface, and wherein the second recess includes a second surface;
a first fixing plate disposed in the first recess of the body and on the first surface;
a second fixing plate disposed in the second recess of the body and on the second surface;
a first light source disposed in the first recess of the body and on the first fixing plate;
a second light source disposed in the second recess of the body and on the second fixing plate, wherein the first light source and the second light source are disposed symmetrically with each other with respect to the central axis of the body;
a first light guide unit which has one side optically coupled to the first light source; and
a second light guide unit which has one side optically coupled to the second light source,
wherein the first and the second surfaces form an acute angle with the central axis of the body,
wherein the first light guide unit and the second light guide unit are extended from the first light source and the second light source, respectively, in opposite directions from each other,
wherein the first light guide unit and the second light guide unit have a shape of which a central portion is upwardly convexly curved,
wherein each of the first light guide unit and the second light guide unit emits lights upward and downward,
wherein the first light source comprises a first substrate and a first light emitting device,
wherein the second light source comprises a second substrate and a second light emitting device,
wherein the first light emitting device is disposed in a first groove of the first light guide unit and the second light emitting device is disposed in a second groove of the second light guide unit, and
wherein the one side of the first light guide unit comprises at least one curved portion on which light from the first light emitting device is incident.

13. The lighting device of claim 12, further comprising a cover which is disposed under the one side of the first and the second light guide units and allows the light from the curved portion to pass therethrough.

14. The lighting device of claim 13, wherein the cover is made of an opaque material and comprises an optical transmitting plate for allowing the light from the curved portion to pass therethrough.

15. The lighting device of claim 12, further comprising a first end cap and a second end cap which are coupled to both ends of the body, respectively.

16. The lighting device of claim 12, wherein the body comprises a connection member which is connected to a rope that is connected to the outside.

17. A lighting device comprising:
a body having a predetermined length in one direction and a tubular shape with an empty interior, wherein the body includes a first surface and a second surface which are disposed symmetrically with each other with respect to a central axis of the body;
a first light source comprising a first substrate disposed on the first surface of the body and a first light emitting device disposed on a side of the first substrate;
a second light source comprising a second substrate disposed on the second surface of the body and a second light emitting device disposed on a side of the second substrate;
a first light guide unit disposed on the first light source comprising a first side having a first incident surface on which light from the first light emitting device is incident; and
a second light guide unit disposed on the second light source comprising a second side having a second incident surface on which light from the second light emitting device is incident,
wherein the side the first light guide unit comprises a first curved portion on which the light has passed through the first surface is incident,
wherein the side the second light guide unit comprises a second curved portion on which the light has passed through the second surface is incident,
wherein a critical angle of each of the first and second curved portions is greater than an incident angle of the light incident on each of the first and second curved portions,
wherein a cover is disposed under the side of the first and second light guide units,
wherein the first curved portion has a range from the side of the first light guide unit to a first point, and
wherein the first point is an intersection between the first light guide unit and a segment connecting the first light emitting device with one end of the cover.

18. The lighting device of claim 17, wherein the cover is made of an opaque material and comprises an optical transmitting plate for allowing the light from the first and second curved portions to pass therethrough.

19. The lighting device of claim 17, further comprising a first end cap and a second end cap which are coupled to both ends of the body, respectively.

* * * * *